(12) United States Patent
Osswald et al.

(10) Patent No.: US 9,205,590 B2
(45) Date of Patent: Dec. 8, 2015

(54) POLYMER PELLETIZATION VIA MELT FRACTURE

(71) Applicant: Wisconsin Alumni Research Foundation, Madison, WI (US)

(72) Inventors: Tim Andreas Osswald, Madison, WI (US); William Mauricio Aquite, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 229 days.

(21) Appl. No.: 13/787,490

(22) Filed: Mar. 6, 2013

(65) Prior Publication Data

US 2013/0234357 A1   Sep. 12, 2013

Related U.S. Application Data

(63) Continuation-in-part of application No. 13/787,217, filed on Mar. 6, 2013.

(60) Provisional application No. 61/607,214, filed on Mar. 6, 2012.

(51) Int. Cl.
*B01J 2/04* (2006.01)
*B29C 47/00* (2006.01)
*B29B 9/06* (2006.01)
*B29C 47/92* (2006.01)
*B29C 47/12* (2006.01)

(52) U.S. Cl.
CPC ............ *B29C 47/0066* (2013.01); *B01J 2/04* (2013.01); *B29B 9/06* (2013.01); *B29C 47/0011* (2013.01); *B29C 47/0076* (2013.01); *B29C 47/0085* (2013.01); *B29C 47/92* (2013.01); *B29C 47/0014* (2013.01); *B29C 47/12* (2013.01); *B29C 2947/926* (2013.01); *B29C 2947/92704* (2013.01); *B29C 2947/92904* (2013.01)

(58) Field of Classification Search
None
See application file for complete search history.

(56) References Cited

U.S. PATENT DOCUMENTS

| | | | | | |
|---|---|---|---|---|---|
| 2,510,574 | A | * | 6/1950 | Greenhalgh | 264/9 |
| 3,378,883 | A | * | 4/1968 | Lapple | 425/7 |
| 4,303,603 | A | * | 12/1981 | Torobin | 264/69 |
| 4,960,547 | A | * | 10/1990 | Reinhard | 264/11 |
| 5,063,002 | A | * | 11/1991 | Luker | 264/12 |
| 5,171,489 | A | * | 12/1992 | Hirao et al. | 264/8 |
| 5,280,884 | A | * | 1/1994 | Dorri | 266/202 |
| 2008/0122132 | A1 | * | 5/2008 | Kinoshita et al. | 264/12 |

OTHER PUBLICATIONS

Martin Launhardt. "Manufacturing of micropellets using Rayleigh disburbances." M.S. Mech. Engineering Thesis, University of Wisconsin-Madison, 96 pgs. (2011). Call No. AWO L383 M377.

(Continued)

*Primary Examiner* — Mary F Theisen
(74) *Attorney, Agent, or Firm* — Crawford Maunu PLLC

(57) ABSTRACT

Polymer pellets are formed using air to influence the separation of polymer from a polymer melt. In accordance with one or more embodiments, a polymer material is extruded through a nozzle to form a polymer melt extending from the nozzle. A non-uniform thickness is generated in the polymer melt using a gas or gasses to apply a drag force to the polymer melt. This drag force reduces a thickness of a portion of the polymer melt adjacent the nozzle, and the polymer melt is fractured into discrete droplets at the reduced thickness. The discrete droplets are then solidified to form pellets.

20 Claims, 3 Drawing Sheets

(56) References Cited

OTHER PUBLICATIONS

Willaim Aquite et al. "Notes on the Micropelletization of Polyer Resins." ANTEC Conference Proceedings 2, 70th Annual Tech. Conference, p. 1136-1140 (2012). ISBN 9781622760831.

Willaim Aquite et al. "Micropellitization Using Rayleigh Disturbances." NSF CMMI Engineering Research and Innovation Conference, Poster, 1 pg. (Jul. 2012).

Daniel Kasperek, John Puentes, William Aquite, Natalie Rudolph, Tim Osswald. "Optimized Micropelletization Using Raleigh Disturbances." International Polymer Colloquium, Poster, 1 pg. (Apr. 2012).

Martin Launhardt, William Aquite, Natalie Rudolph, and Tim Osswald. "Manufacturing of Micropellets Using Rayleigh Disturbances." ANTEC 2011, 14 pgs. (May 2011).

D. Drummer, D. Rietzel and F. Kühnlein. "Development of a characterization approach for the sintering behavior of new thermoplastics for selective laser sintering." Physics Procedia 5, p. 533-542 (2010).

T. Funada and D.D. Joseph. "Viscous potential flow analysis of capillary instability," International Journal of Multiphase Flow, vol. 28, pp. 1459-1478 (Sep. 2002).

S.A. Khan, R.K. Prud'homme, and R.G. Larson. "Comparison of the rheology of polymer melts in shear, and biaxial and uniaxial extensions." Rheologica Acta, vol. 26, pp. 144-151 (Mar. 1987).

N. Ashgriz and F. Mashayek. "Temporal analysis of capillary jet breakup," Journal of Fluid Mechanics, pp. 163-190 (1995).

F.P. P La Mantia and D. Acierno. "Influence of the molecular structure on the melt strength and extensibility of polyethylenes," Polymer Engineering & Science, vol. 25, pp. 279-283 (1985).

A.K. Doufas, L. Rice, and W. Thurston. "Shear and extensional rheology of polypropylene melts: Experimental and modeling studies," Journal of Rheology, vol. 55, p. 95 (2011).

A.D. Gotsis, B.L.F. Zeevenhoven, and C. Tsenoglou. "Effect of long branches on the rheology of polypropylene," Journal of Rheology, vol. 48, p. 895 (2004).

B.B. Sauer and N.V. Dipaolo. "Surface tension and dynamic wetting on polymers using the Wihelmy method: Applications to high molecular weights and elevated temperatures." Journal of Colloid and Interface Science, 144(2), pp. 527-537 (1991).

\* cited by examiner

POLYMER PELLETIZATION VIA MELT FRACTURE

FIELD

Aspects of the present disclosure relate generally to pelletizing, and more specifically, to generating polymer pellets via melt fracture.

BACKGROUND

Polymer-based pellets are useful in a multitude of applications. In particular, powders and micropellets (e.g., with cross-sections of less than 2 mm, 50 microns or smaller) have been in increasing demand in the field of polymer processing. For example, processes such as the selective laser sintering processes (SLS) benefit from powders having a specific size distribution and shape in order to achieve high quality products. High powder layer density and small porosity can be achieved with a continuous size distribution of spherical particles.

While various micropellets have seen increasing demand, controlling the properties of pellets in terms of their size and shape at desirable costs has been challenging. Previous approaches have been costly to implement and resulting products have been insufficient to meet certain needs. These and other problems have been challenging to the manufacture and implementation of a variety of types of micropellets.

SUMMARY

Various aspects of the present disclosure are directed to forming polymer-based pellets. In accordance with one or more embodiments, polymer material is extruded through a nozzle to form a polymer melt extending from the nozzle, and the polymer melt is fractured into discrete droplets as follows. A non-uniform thickness is generated in the polymer melt by applying a drag force using gas flowing along the polymer melt, and thereby reducing a thickness of a portion of the polymer melt adjacent the nozzle. The polymer melt is then fractured at the portion having the reduced thickness, and the discrete droplets are solidified to form pellets.

Another embodiment is directed to a method for manufacturing polymer-based pellets as follows. A polymer melt is extruded from a die, and a drag force is applied to the polymer melt as it is extruded by flowing heated gas along a portion of the polymer melt extending from the die. The drag force is used to repeatedly fracture and separate portions of the polymer melt as the polymer melt is extruded from the die. The polymer melt is fractured adjacent the die such that the separated portions of the polymer melt have a volume that is greater than half a total volume of a portion of the polymer melt extending from the die when the polymer melt is fractured (e.g., prior to Rayleigh disturbances being introduced in the polymer melt). Discrete droplets are formed from each separated portion of the polymer melt, and the discrete droplets are solidified into pellets.

Another example embodiment is directed to an apparatus including a polymer extruder that extrudes a polymer material, and a die having a nozzle via which the polymer material is passed to form a polymer melt extending therefrom. The die also has a gas channel via which a gas or gasses are flowed and directed to the polymer melt extending from the die. The die and the polymer extruder fracture the polymer melt into discrete droplets as follows, for each discrete droplet. A non-uniform thickness is generated in the polymer melt by flowing gas along and applying a drag force to the polymer melt, therein reducing a thickness of a portion of the polymer melt adjacent the nozzle. Each discrete droplet is formed by using the air to fracture the polymer melt at the portion having the reduced thickness, with the discrete droplets being solidified into pellets.

The above summary is not intended to describe each embodiment or every implementation of the present disclosure. The figures and detailed description that follow more particularly exemplify various embodiments.

DESCRIPTION OF THE FIGURES

Aspects of the disclosure may be more completely understood in consideration of the following detailed description of various embodiments in connection with the accompanying drawings, in which.

Figure 1:
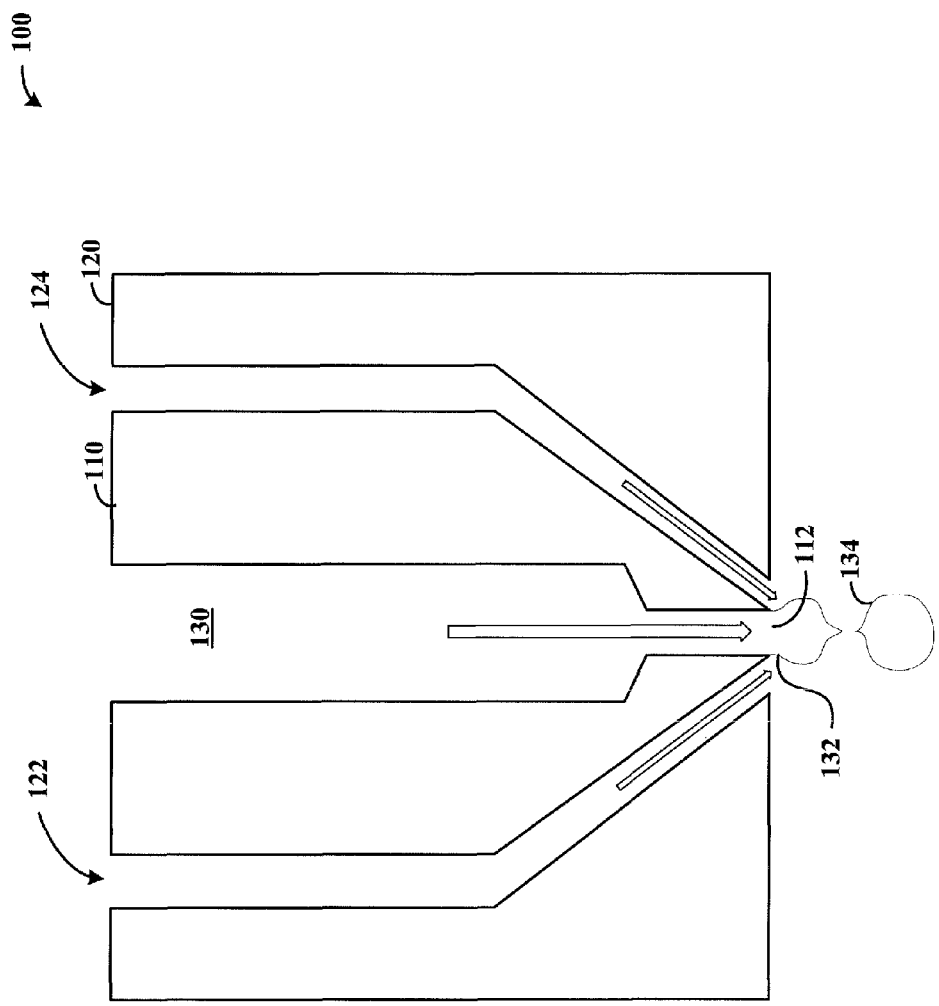
FIG. 1 shows a pelletizing apparatus and method, in accordance with an example embodiment.

While various embodiments of the disclosure are amenable to modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION

Various aspects of the present disclosure are directed to forming polymer-based pellets. While the present disclosure is not necessarily limited as such, various aspects may be appreciated through a discussion of examples using this context.

In connection with various example embodiments, deviatoric stresses are applied to a polymer melt extrudate by using a controlled flow of gas or gasses such as air to cause a non-uniform deformation and melt fracture. The resulting polymer melt droplets are cooled to form pellets (e.g., micropellets). Such embodiments can be effected at process conditions in which the polymer is likely to undergo strain hardening, in which high gas stream speed is used to cause brittle breakup (melt fracture) of the polymer thread. This breakup can be effected adjacent a nozzle via which the polymer melt is extruded, with the respective pellets being repeatedly separated from a contiguous portion of the polymer melt nearly immediately upon extrusion from the nozzle. For example, the extruded polymer melt can be fractured such that the volume of the polymer melt extrudate (extending from the nozzle) is less than about twice the volume of the resulting pellets.

In connection with one or more embodiments, it has been further discovered that this melt fracture can be effected before Rayleigh disturbances take place (e.g., instead of Rayleigh disturbances), or with negligible Rayleigh disturbances. For example, by flowing gas or gasses along the polymer melt extrudate immediately adjacent the nozzle, the portion of the polymer melt extending from the nozzle prior to melt fracture is kept small with the remaining portion of polymer melt being about the same as or smaller than the size of the resulting droplet. Furthermore, by fracturing the polymer melt sufficiently adjacent the nozzle with heated gas flowing along the polymer melt, the fractured portion of the polymer melt can be maintained in a non-solid state in which surface tension characteristics of the fractured portion can be used to shape a droplet from the fractured portion.

More specific embodiments are directed to methods and/or apparatuses for forming polymer pellets as follows. A polymer material is extruded through a nozzle to form a polymer melt extending from the nozzle, and the polymer melt is fractured into discrete droplets as it exits the nozzle. In particular, a non-uniform thickness is generated in the polymer melt by flowing high-speed gas along the polymer melt and using the gas to apply a drag force to the polymer melt. This drag force reduces a thickness of a portion of the polymer melt adjacent the nozzle. The discrete droplet is formed by fracturing the polymer melt at the reduced thickness, and the droplets are solidified to form pellets.

Using this approach, individual droplets can be repeatedly formed and solidified, by causing the melt fracture to occur immediately adjacent the nozzle using drag force to reduce the size/thickness of the polymer melt, and fracturing the polymer melt at the reduced cross-section. This can also be carried out in accordance with related surface tension and viscosity characteristics of the material, and set or tuned accordingly to control the droplet size. Such droplets may be formed, for example, in one or more spherical, lenticular, obloid, or oblate spherical shapes, as may be related to the aforesaid surface tension. In this context, single droplets can be repeatedly fractured off the polymer melt as it exits the nozzle, leaving a small amount of the polymer melt extending from the nozzle immediately after fracture. This approach can be used to generate individual droplets of consistent size, and mitigate undesirable droplet size disparity that can occur when highly elongated portions of polymer melt extend from the nozzle and break at larger distances from the nozzle.

The location of the melt fracture and the corresponding droplet size are controlled using a variety of approaches, to suit various embodiments. For example, one or more of gas temperature, gas speed, polymer melt temperature (or related temperature of a die via which the polymer melt is extruded), and polymer melt extrusion rate can be controlled to set the location of the melt fracture, as well as to control the size of the resulting droplets. For instance, melt strength and viscosity can be used to determine the size of the particles after breakup, and molecular structure of the polymer material can be used to influence the occurrence of breakup. By increasing the viscosity of the melt, the diameter of the resulting pellets can be increased. In some implementations, drag force is applied to induce deviatoric stresses and/or strain hardening in the polymer melt, at a reduced-thickness portion at which the melt fracture is effected. In other embodiments, the melt fracture is controlled so that the volume of polymer melt that forms each droplet is larger than a remaining portion of the polymer melt extending from the nozzle. Such an approach can be carried out, for example, by using drag force via the applied gas to neck down a portion of the polymer melt and separate a volume of the melt via the necking and ensuing melt fracture. In certain embodiments, the polymer melt is fractured such that the diameter of the fractured melt is greater than the length (e.g., by fracturing the polymer melt at a distance from the nozzle that is less than the diameter of the polymer melt extrudate).

In various embodiments, the polymer melt is fractured by applying drag force to the polymer melt while generating negligible Rayleigh disturbances (e.g., capillary waves). In this context, generating negligible Rayleigh disturbances refers to the fracture of the melt before capillary waves form, in which the fracture mechanism is dominated by the drag force applied. Negligible Rayleigh disturbances involve no or small surface tension-induced oscillations or indentations that lead to stress concentrations which result in fracture of the polymer strand (e.g., where Rayleigh disturbances form droplets via the natural growth of the disturbances and oscillations). Non-negligible Rayleigh disturbances are disturbances that occur in which the melt is broken after capillary waves form. This approach is facilitated by fracturing the polymer melt adjacent a nozzle via which the melt is extruded, before the length of the polymer melt becomes long enough to form a melt thread that is susceptible to Rayleigh disturbances.

Figure 3:
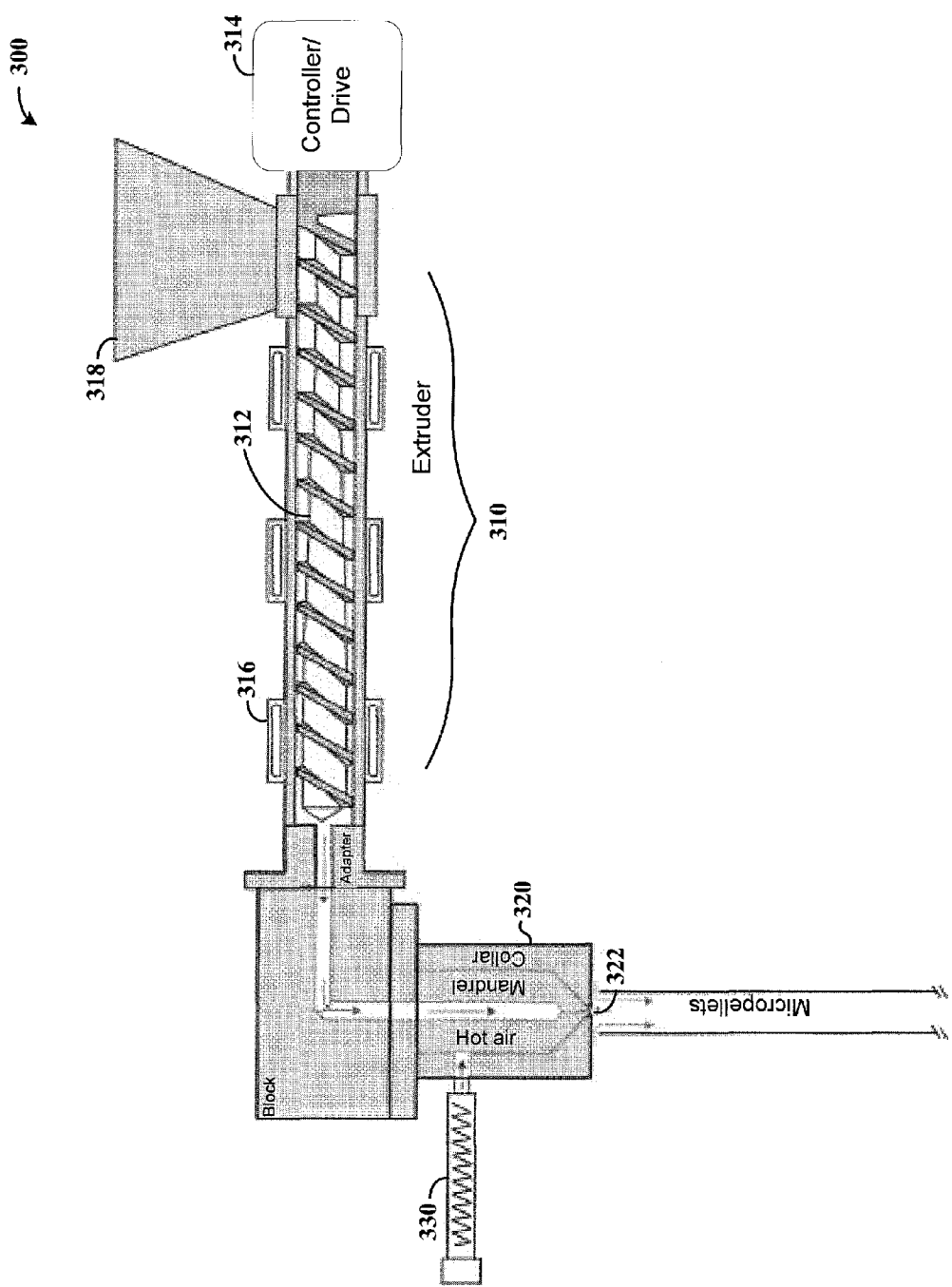
FIG. 3 shows a pelletizing apparatus, in accordance with another example embodiment.

The extrusion rate of the polymer material is controlled to suit one or more embodiments or applications. In some embodiments, the polymer material is extruded at a rate that is below a rate at which melt fracture would occur due to the rapid extrusion (e.g., without the use of gas-induced drag). Such a rate may be one or more orders of magnitude less than a threshold rate at which the polymer melt would exhibit melt fracture caused by the extrusion. For example, certain embodiments are directed to extruding the polymer material by operating a screw (e.g., as shown in FIG. 3) at a linear speed that is less than about 0.5 m/s, and other embodiments are directed to extruding the polymer material at a rate that is less than about 0.02 m/s.

A variety of types of polymer-based materials are used to suit various embodiments. For example, various embodiments are directed to extruding polymer resin that includes a blend of different polymers. Furthermore, the type of polymer and its characteristics relative to extrusion such as brittleness and surface tension can be chosen to facilitate melt fracture as discussed herein.

For general discussion of polymer pelletization, and for specific approaches and experimental-type aspects that may be used in accordance with one or more embodiments described herein, reference may be made to Aquite et al., "Notes on the Micropelletization of Polymer Resins," ANTEC (2012) and the references cited therein, and to the underlying patent application document to which priority is claimed, which are fully incorporated herein by reference.

Turning now to the figures, FIG. 1 shows a cross-sectional view of a pelletizing apparatus 100 and related method aspects, in accordance with another example embodiment.

The apparatus 100 includes a collar 110 and mandrel 120 that are separated by gas flow chamber regions 122 and 124 (e.g., a single cylindrical-type chamber in cross-section). The collar includes a nozzle 112 via which a polymer melt 130 is extruded. The flow of the polymer melt and gas are respectively shown by arrows, with the gas being directed along a portion 132 of the polymer melt 130 that extends from the nozzle 112. In various embodiments, the respective portions as shown are insulated to facilitate control of the temperature of the polymer melt and/or the gas as it is applied to polymer melt extrudate that extends from the nozzle 112.

The speed of the gas is controlled to fracture the melt and produce droplet 134 as shown, adjacent the nozzle 112. As consistent with the above, a multitude of such droplets 134 can be repeatedly fractured from the polymer melt 130 as it is extruded via the nozzle 112. This melt fracture is effected using drag force of the gas, and is carried out adjacent the nozzle and before the remaining portion 132 reaches the size of the droplet 134. The drag force creates a local pressure difference along the polymer melt and locally decreases the diameter of the thread. Surface tension and deviatoric stresses lead to a pinch off and eventual fracture of droplets. In this context, the melt fracture is controlled via drag and before any wave-like Rayleigh disturbances occur over the length of an extrudate. In certain embodiments, a multitude of such apparatuses 100 (e.g., in an array) are used as nozzles being fed by an extruder or extruders, to form pellets. Further, the size and shape of the droplet 134 as shown is exemplary, with different sizes and shapes set using one or more aspects of the gas flow, polymer extrusion, polymer material characteristics and other conditions as discussed above.

Figure 2:
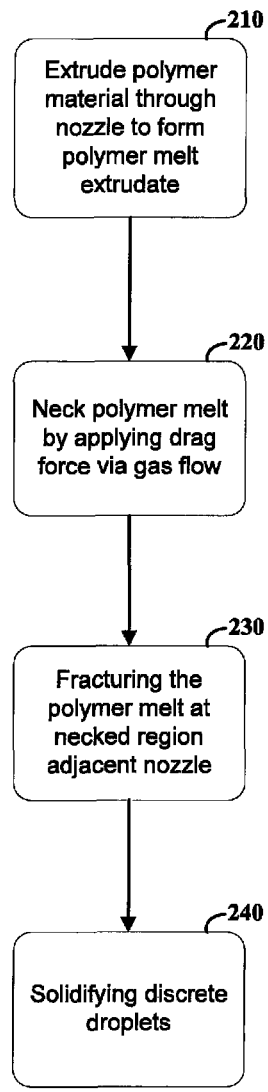
FIG. 2 is a flow diagram for a pelletizing method, in accordance with another example embodiment.

FIG. 2 is a flow diagram for a pelletizing method, in accordance with another example embodiment. At block 210, polymer material is extruded through a nozzle and forms a polymer melt extrudate that extends from the nozzle. At block 220, the polymer melt is necked at a portion adjacent the nozzle by applying a drag force to the polymer melt, using a gas or gasses such as air. The polymer melt is then fractured at block 230, at the necked region adjacent the nozzle to form a droplet of the polymer melt extrudate. This necking and resulting fracture is, as consistent with the above, carried out using drag force applied to the polymer melt extrudate, as the extrudate extends from the nozzle, and generally before Rayleigh disturbances occur (e.g., such that the volume of the fractured droplet is greater than the remaining volume of extrudate extending from the nozzle). The respective droplets are solidified at block 240 as they are fractured and separated from the rest of the polymer melt.

The approaches to melt fracture and formation of pellets as discussed herein can be carried out with a variety of different types of extrusion equipment, to suit particular applications. FIG. 3 shows a pelletizing apparatus 300, in accordance with one such example embodiment. The apparatus 300 operates to rapidly separate polymer melt extrudate via melt fracture adjacent a nozzle through which the polymer melt is extruded as discussed herein, as may be implemented in a manner similar to that shown with the apparatus 100 in FIG. 1.

The apparatus 300 includes an extruder 310 that feeds a polymer melt to a die 320, via which the polymer melt is extruded. The extruder 310 includes a screw 312 and a controller/drive 314 that operates the screw as well as heating components that heat the polymer as it is extruded, with heating component 316 shown by way of example. Polymer resin is supplied by a hopper 318.

The die 320 passes the polymer melt through a nozzle 322 and directs air along the polymer melt extending from the nozzle. An air supply component 330 supplies the air to the die 320, at a controlled temperature and pressure to supply a desirable flow rate and resultant drag force upon the polymer melt. This drag force is used to generate a non-uniform (reduced) thickness in the polymer melt adjacent the nozzle 322, and fracture the polymer melt at a reduced thickness portion thereof. The air supply component 330 may include, for example, a compressor or other type of pump that generates compressed air. In some embodiments, one or both of the air supply component 330 and the die 320 includes a heating component that heats the compressed air prior to flowing along the polymer melt.

Droplets are foamed from each fractured portion of the polymer melt as described herein. These droplets are then cooled to form pellets (e.g., micropellets) as they fall away from the nozzle 322. The apparatus 300 controls one or more of air temperature, air flow rate, polymer melt temperature and polymer melt extrusion rate to set conditions of the melt fracture and the resulting pellets formed upon cooling of the droplets. In some embodiments, the apparatus 300 includes an insulative material that insulates the air flow from other components of the die via which the polymer melt flows, to facilitate the independent control of air and die temperature.

In some embodiments, the controller/drive 314 and air supply component 330 are commonly controlled or otherwise integrated. In certain embodiments, one or both of these components operates to control the fracture and size of the discrete droplets by independently controlling at least one of a temperature of the gas, speed of the gas relative to the polymer melt, polymer melt temperature and polymer melt extrusion rate.

Various embodiments described above and shown in the figures may be implemented together and/or in other manners. One or more of the items depicted in the drawings/figures herein, in an underlying patent document to which priority is claimed can also be implemented in a more separated or integrated manner, or removed and/or rendered as inoperable in certain cases, as is useful in accordance with particular applications. For example, different types of polymer resins may be implemented under differing processing conditions to cause melt fracture adjacent a die nozzle as discussed herein. In view of this and the description herein, those skilled in the art will recognize that many changes may be made thereto without departing from the spirit and scope of the present disclosure.

What is claimed is:

1. A method comprising:
    extruding a polymer material through a nozzle and forming a polymer melt extending from the nozzle;
    fracturing the polymer melt into discrete droplets by, for each discrete droplet,
        generating a non-uniform thickness in the polymer melt by flowing gas along the polymer melt and applying a drag force to the polymer melt, via the flowing gas, to reduce a thickness of a first portion of the polymer melt that extends from the nozzle to a second portion of the polymer melt, the second portion being thicker than the first portion, and
        forming the discrete droplet including the second portion by fracturing the polymer melt at the first portion having the reduced thickness, leaving a small amount of the polymer melt extending from the nozzle immediately after fracture; and
    forming pellets by solidifying the discrete droplets.

2. The method of claim 1, wherein fracturing the polymer melt includes fracturing the polymer melt to form the discrete droplet having a volume that is at least half of the volume of the polymer melt that extends from the nozzle when the polymer melt is fractured.

3. The method of claim 1, wherein
    generating the non-uniform thickness includes using the drag force to reduce a cross-sectional thickness of a portion of the polymer melt extending from the nozzle, and
    fracturing the polymer melt includes fracturing the polymer melt at the portion having the reduced cross-sectional thickness.

4. The method of claim 1, wherein fracturing the polymer melt includes separating a volume of the polymer melt that forms the discrete droplet, leaving a remaining volume of the polymer melt that extends from the nozzle, the remaining volume being less than the volume of the polymer melt that forms the discrete droplet.

5. The method of claim 1, wherein fracturing the polymer melt includes fracturing a portion of the polymer melt having a diameter that is greater than its length.

6. The method of claim 1, wherein applying the drag force to the polymer melt includes strain hardening the polymer melt at the portion having the reduced thickness.

7. The method of claim 1, wherein generating non-uniform thickness includes applying drag force to the polymer melt with the gas, while generating negligible Rayleigh disturbances.

8. The method of claim 1, wherein extruding the polymer material through a nozzle includes extruding the polymer material at a rate that is an order of magnitude less than a threshold rate at which the polymer melt would exhibit melt fracture caused by the extrusion.

9. The method of claim 1, wherein forming the discrete droplet includes fracturing the polymer melt at a portion of the melt that extends from the nozzle to the discrete droplet, to maintain the droplet in a non-solid state while using surface tension in the polymer melt to shape the fractured polymer melt into a droplet.

10. The method of claim 1, the steps of generating a non-uniform thickness and forming the discrete droplet are performed repeatedly to form each discrete droplet from a contiguous portion of the polymer melt as it is extruded through the nozzle.

11. The method of claim 1, further including controlling the fracture and size of the discrete droplets by independently controlling temperature of the gas, speed of the gas relative to the polymer melt, polymer melt temperature and polymer melt extrusion rate.

12. The method of claim 1, wherein fracturing the polymer melt includes applying deviatoric stresses via the gas.

13. The method of claim 12, wherein fracturing the polymer melt includes fracturing the polymer melt by causing strain hardening in the polymer melt.

14. A method for manufacturing polymer-based pellets, the method comprising:
extruding a polymer melt from a die;
while extruding the polymer melt, applying a drag force to the polymer melt by flowing heated gas along a portion of the polymer melt extending from the die;
using the drag force to repeatedly fracture and separate portions of the polymer melt as the polymer melt is extruded from the die, the polymer melt being fractured adjacent the die and the separated portions of the polymer melt having a volume that is greater than half a total volume of a portion of the polymer melt extending from the die when the polymer melt is fractured;
forming discrete droplets from each separated portion of the polymer melt; and
solidifying the discrete droplets into pellets.

15. The method of claim 14, wherein using the drag force to repeatedly fracture and separate portions of the polymer melt prior to Rayleigh disturbances being introduced in the polymer melt.

16. The method of claim 14, wherein separating portions of the polymer melt includes using the drag force to reduce a diameter of a portion of the polymer melt extending from the die and fracturing the polymer melt at the portion having the reduced diameter.

17. The method of claim 14, further including controlling the volume of the separated portions of the polymer melt by independently controlling the temperature of the gas, speed of the gas relative to the polymer melt, the polymer melt temperature and the polymer melt extrusion rate.

18. An apparatus comprising:
a polymer extruder configured and arranged to extrude a polymer material; and
a die coupled to the polymer extruder and having a nozzle and a gas channel, the die and the polymer extruder being configured and arranged to form a polymer melt extending from the nozzle and to fracture the polymer melt into discrete droplets by, for each discrete droplet,
generating a non-uniform thickness in the polymer melt by flowing gas along the polymer melt and applying a drag force to the polymer melt, via the gas, to reduce a thickness of a first portion of the polymer melt that extends from the nozzle to a second portion of the polymer melt, the second portion being thicker than the first portion, and
forming the discrete droplet including the second portion by using the flowing gas to fracture the polymer melt at the portion having the reduced thickness, leaving a small amount of the polymer melt extending from the nozzle immediately after fracturing the polymer melt, and solidifying the discrete droplets into pellets.

19. The apparatus of claim 18, further including at least one controller configured and arranged to control the fracture and size of the discrete droplets by independently controlling at least one of a temperature of the gas, speed of the gas relative to the polymer melt, polymer melt temperature and polymer melt extrusion rate.

20. The apparatus of claim 18, wherein the die and the polymer extruder are configured and arranged to repeatedly fracture the polymer melt to form discrete droplets having a volume that is at least half of the volume of the polymer melt that extends from the nozzle when the polymer melt is fractured.

\* \* \* \* \*